US007055259B2

(12) United States Patent
Goldman

(10) Patent No.: US 7,055,259 B2
(45) Date of Patent: Jun. 6, 2006

(54) TEMPLATE SET FOR DRAWING THREE-DIMENSIONAL SHAPES

(76) Inventor: Alfred Goldman, 444 E. 82nd St., New York, NY (US) 10028

( * ) Notice: Subject to any disclaimer, the term of this patent is extended or adjusted under 35 U.S.C. 154(b) by 13 days.

(21) Appl. No.: 10/886,986

(22) Filed: Jul. 8, 2004

(65) Prior Publication Data

US 2006/0005411 A1 Jan. 12, 2006

(51) Int. Cl.
*B43L 13/14* (2006.01)
*G09B 11/04* (2006.01)

(52) U.S. Cl. ............................ 33/562; 33/566; 434/87

(58) Field of Classification Search .................. 33/562, 33/563, 564, 565, 566; 434/85, 91, 92
See application file for complete search history.

(56) References Cited

U.S. PATENT DOCUMENTS 1,541,480 A * 6/1925 Compton et al. ............ 434/87
2,293,696 A * 8/1942 Burchell ...................... 434/87
2,444,860 A * 7/1948 Summer ...................... 434/87
2,720,722 A * 10/1955 Hiser .......................... 434/85
2,797,493 A * 7/1957 Watson ........................ 33/565
3,633,286 A * 1/1972 Maurer ........................ 33/563
4,205,849 A * 6/1980 Perkins ........................ 434/87
5,000,688 A * 3/1991 Clamp .......................... 33/564
5,795,154 A * 8/1998 Woods ......................... 434/87
6,357,130 B1 * 3/2002 Rank ........................... 33/562

* cited by examiner

*Primary Examiner*—Christopher W. Fulton
(74) *Attorney, Agent, or Firm*—Cohen, Pontani, Lieberman & Pavane

(57) ABSTRACT

A template set includes a first template for drawing the contour of a three-dimensional shape and a second template for drawing the visible and invisible edges of the three-dimensional shape. The first template has a plurality of apertures, wherein each aperture has a periphery circumscribing an area, the periphery representing the contour of a pictorial representation of a three-dimensional shape. The second template has a plurality of sets of linear apertures, wherein each set of linear apertures corresponds to a respective aperture in the first template. The linear apertures include continuous linear apertures which are used to draw solid lines representing visible edges within the contour, and intermittent linear apertures which are used to draw dashed lines representing hidden edges within the contour.

12 Claims, 3 Drawing Sheets

TEMPLATE SET FOR DRAWING THREE-DIMENSIONAL SHAPES

BACKGROUND OF THE INVENTION

1. Field of the Invention

The invention relates to a template set for drawing the contour of a three-dimensional shape.

2. Description of the Related Art

Templates for drawing two-dimensional shapes such as circles, squares, rectangles, letters, and symbols are well known. Templates for drawing three-dimensional shapes are also known, and generally consist of a single template which is used to generate the contour of the shape as well as its visible edges by manipulating the template to a variety of positions on the drafting sheet. U.S. Pat. No. 6,357,130, for example, discloses a chevron-shaped drafting template for preparing axonometric drawings, e.g. trimetric, dimetric, and isometric projections of a cube. This is accomplished by drawing a base line, rotating the template through a variety of angles to align indicia on the face of the template with lines which have already been drawn, and drawing additional lines to complete the figure. While straightforward enough for a skilled draftsman, the use of this template would not be self-evident to an untrained user. Further, it does not permit drawing a large variety of shapes and does not readily permit rendering the hidden edges of those shapes. A template set for drawing three-dimensional shapes which is simple to use and can serve as a teaching tool for young people is needed.

SUMMARY OF THE INVENTION

A template set according to the invention includes a first template having a plurality of apertures of varying shapes, each aperture having a periphery which corresponds to the contour of a three-dimensional shape as seen in two dimensions. The template set also includes a second template having a plurality of sets of linear apertures which fall within the areas circumscribed by respective apertures in the first template. Each set of linear apertures includes at least one substantially continuous linear aperture corresponding to a visible edge of the three-dimensional shape to be drawn, and at least one intermittent linear aperture corresponding to a hidden edge of the shape to be drawn. Each intermittent linear aperture comprises a series of relatively short apertures separated by bridges in the second template.

A view of a three-dimensional shape can be drawn by using an aperture in the first template to draw the contour of the shape, aligning the corresponding set of linear apertures of the second template within the contour, and using the continuous linear apertures to draw the solid lines representing the visible edges of the shape. Where it is also desired to render the hidden edges, this can be done using the intermittent linear apertures to draw dashed lines representing the hidden edges.

Since the dashed lines frequently intersect the solid lines, it is necessary for the continuous linear apertures to pass through the intermediate linear apertures at the bridges. The bridges thereby support the areas of the second template which are circumscribed by linear apertures.

The template set according to the invention may be designed to render any of a variety of two-dimensional pictorial projections of three-dimensional shapes, including but not limited to oblique projections, perspective projections, and axonometric projections. For definitions of the various projections, see U.S. Pat. No. 6,357,130.

The second template may be provided with printed outlines surrounding the respective sets of linear apertures, wherein the outlines correspond to the peripheries of the apertures in the first template and therefore to the contours drawn using these apertures. Where the second template is made of a transparent or translucent plastic, this outline may be aligned with the contour already drawn. It also serves as an aid for visualizing the completed drawing.

DETAILED DESCRIPTION OF THE PRESENTLY PREFERRED EMBODIMENTS

Figure 1:
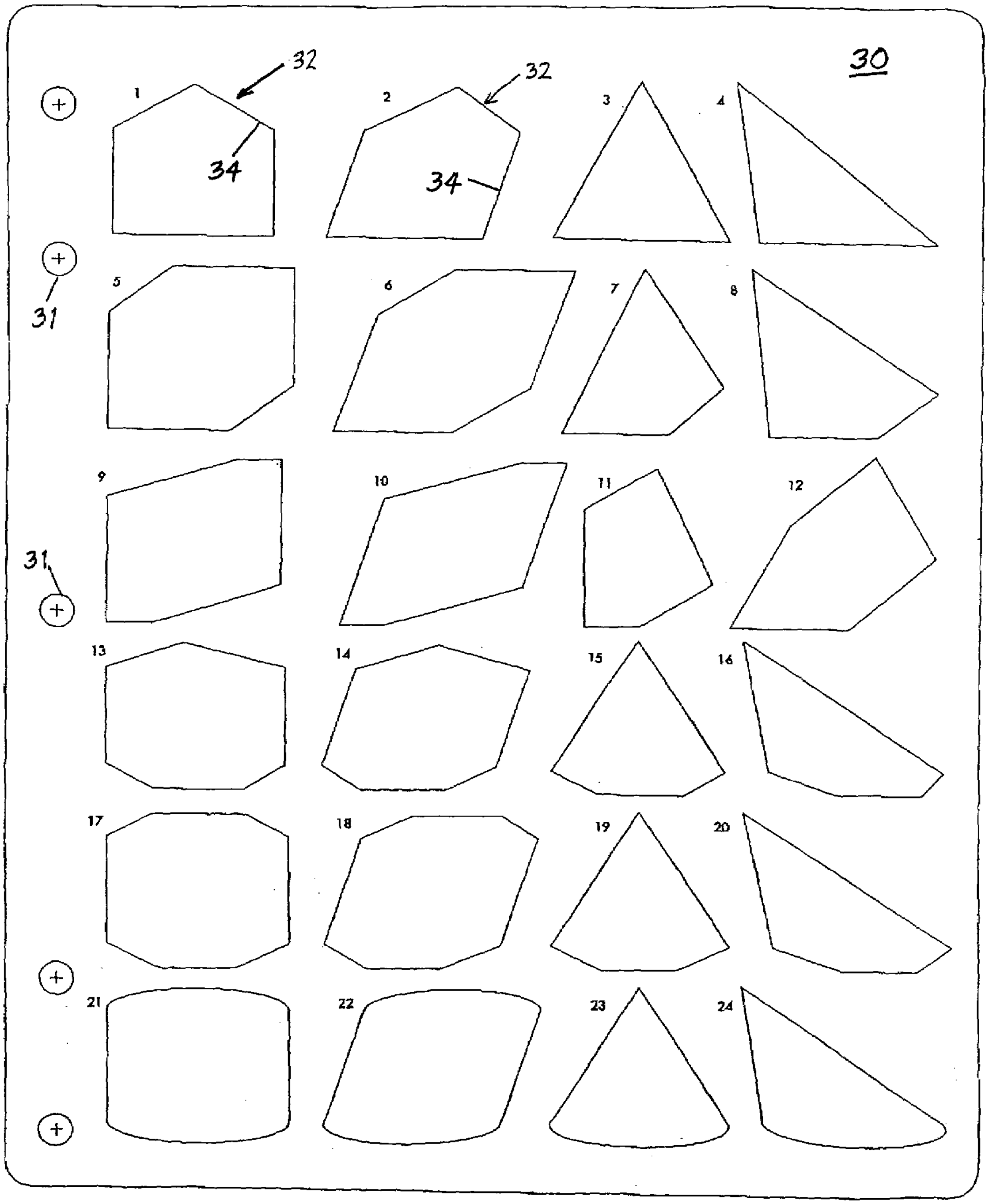
FIG. 1 is a plan view of a first template of an embodiment of the template set according to the invention.

FIG. 1 shows a first template 30 having a plurality of apertures 32, each aperture 32 having a periphery 34 which represents the contour of a three-dimensional shape, the shapes being indicated by reference numerals 1–24. The template 30 is also provided with holes 31 which can be used to make alignment marks for aligning the second template 40 (FIGS. 2 and 3) with contours drawn using the first template 30, as well as for retaining the first template 30 in a binder. The first template 30 is preferably a translucent plastic sheet such as polyethylene in which the holes 31 and apertures 32 are die cut.

Figure 2:
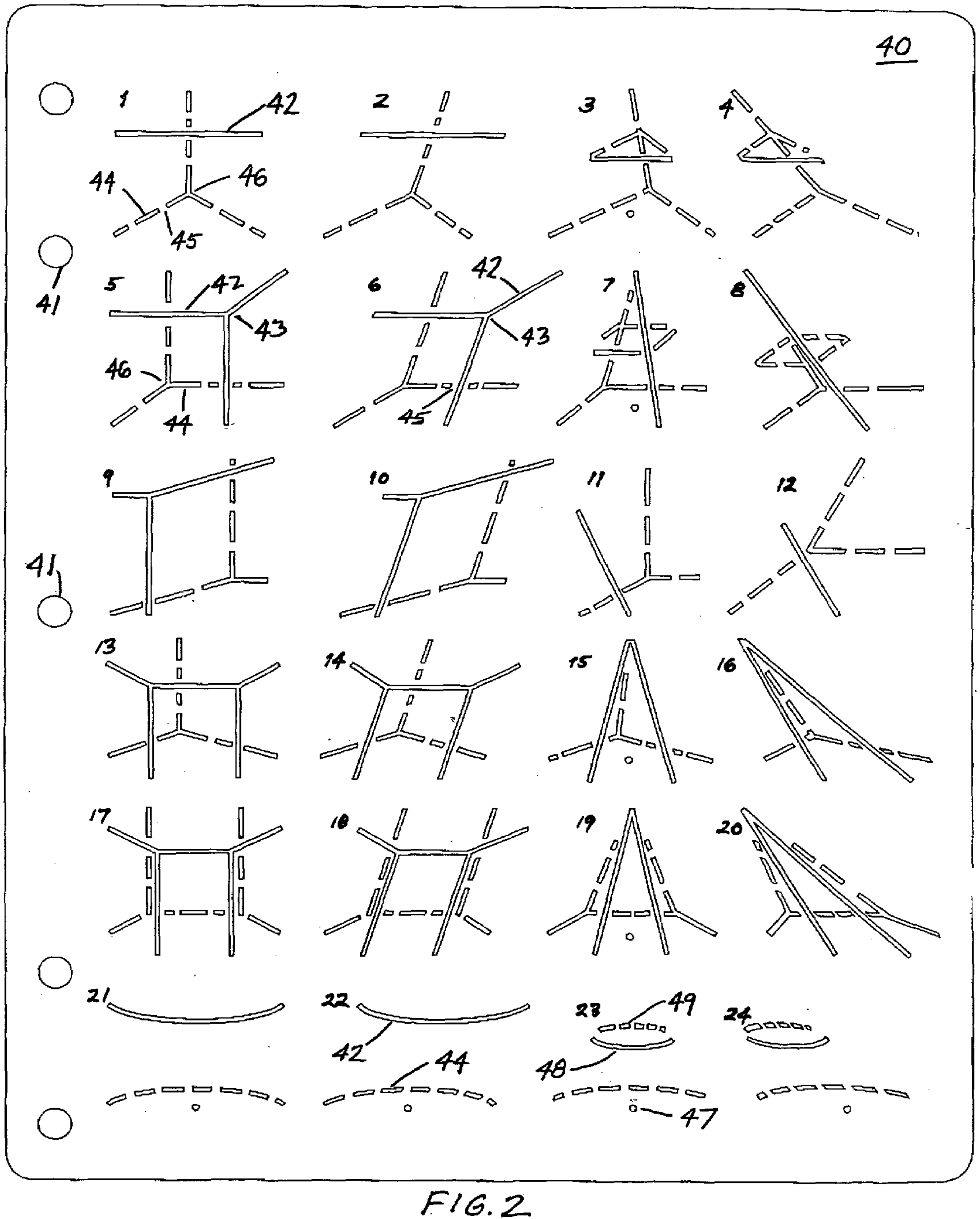
FIG. 2 is a plan view of a second template for use with the first template of FIG. 1.

FIG. 2 shows a second template 40 having alignment/retaining holes 41 which can be aligned with marks made using holes 31 of the first template 30. The second template 40 is provided with a plurality of sets of apertures for drawing visible and hidden edges of the shapes indicated by reference numerals 1–24. Each set of apertures includes at least one substantially continuous linear aperture 42 corresponding to a visible edge of the shape to be drawn, and at least one intermittent linear aperture 44 corresponding to a hidden edge of the shape to be drawn, wherein the intermittent apertures 44 each include a series of relatively short apertures separated by bridges 45.

At least one set of linear apertures includes two or more continuous linear apertures 42 having an intersection 43 which defines a visible corner of the three-dimensional shape, e.g. the shapes 5, 6, 9, 10, 17, and 18. At least one set of linear apertures includes two or more intermittent linear apertures 44 having an intersection 46 which defines a hidden corner of the three-dimensional shape, e.g. the shapes 5, 6, 9, 10, 17, and 18. Where a continuous linear aperture 42 intersects an intermittent aperture 44, it passes through a bridge 45, whereby the bridges 45 provide support for areas of the second template 40 which are circumscribed by the continuous linear apertures 42 and the intermittent linear apertures 44.

Figure 3:
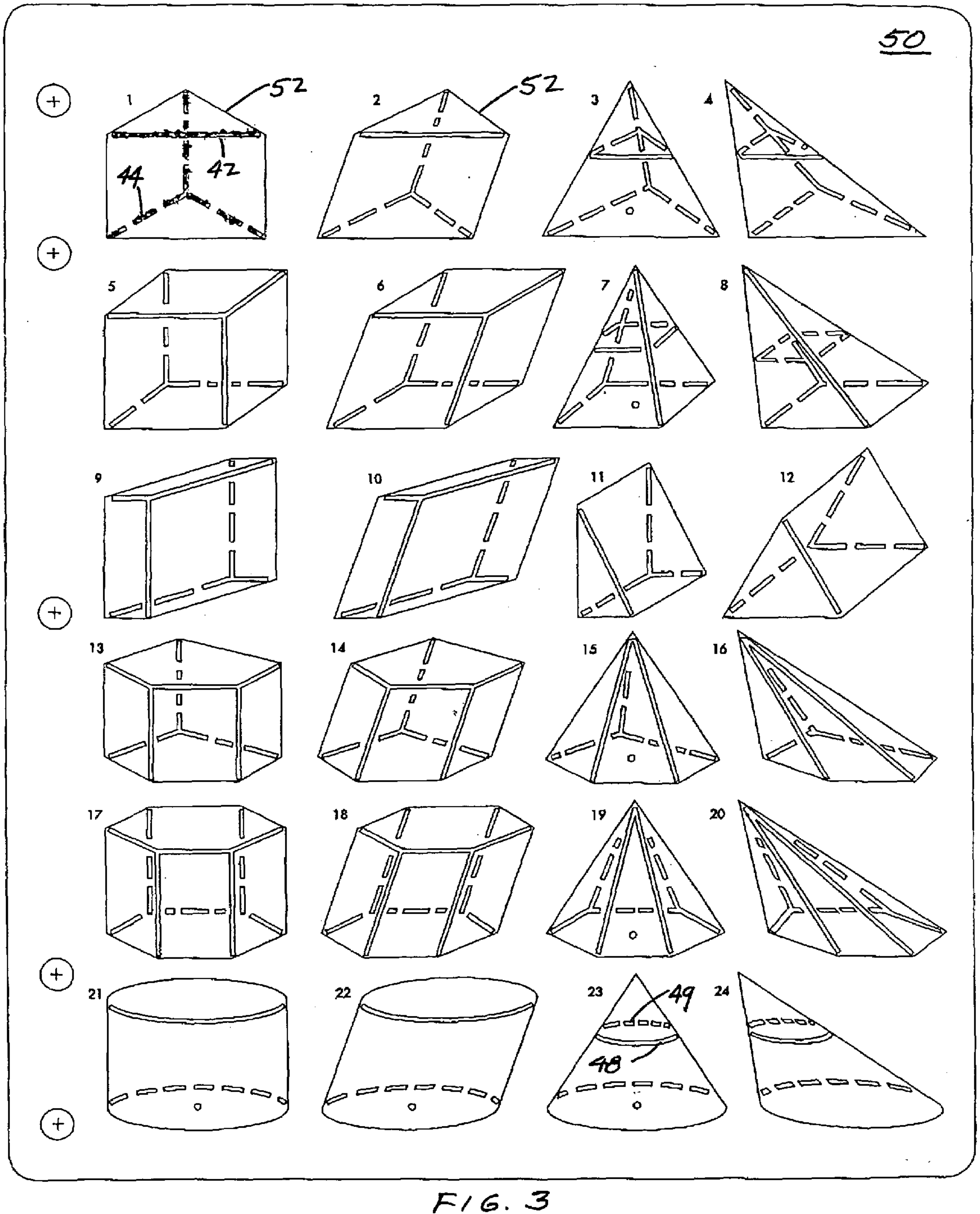
FIG. 3 is a plan view of an alternate second template for use with the first template of FIG. 1.

FIG. 3 shows an alternate second template 50 which is substantially identical to the second template 40, but also includes printed outlines 52 which correspond to the peripheries 34 of apertures 32 shown in FIG. 1. Keeping in mind that the templates are made of translucent plastic, the template 50 of FIG. 3 may also be seen as an overlay of the template 40 on the template 30, or as an overlay of the template 40 on contours drawn using the template 30. Some of the familiar three-dimensional shapes 1–24 are the tetrahedron 3, the oblique tetrahedron 4, the cube 5, the pyramid 7, the right circular cylinder 21, and the right circular cone 23. Note that additional linear apertures 48, 49 are provided for drawing truncated forms of the three-dimensional shapes 1–24, e.g. the continuous linear aperture 48 and the intermittent linear aperture 49 used to draw truncated cones based on the cones 23 and 24.

For the event that it is desired to draw an axis in a three-dimensional shape having an axis, the corresponding set of linear apertures in the second template 40, 50 is provided with an axis hole 47 for marking a point on the axis. A straight edge may then be used to add an axis to the finished drawing.

To use the templates, the contour of a three-dimensional shape is drawn using a selected aperture 32 of the first template 30. The corresponding set of linear apertures of the second template is then aligned within the contour, and solid lines representing the visible edges of the three-dimensional shape are drawn using the continuous linear apertures 42. Where it is desired to draw dashed lines representing hidden edges of the three-dimensional shape, this is done using the intermittent linear apertures 44.

While the use of the first template 30 followed by the second template 40 has been described, it is also possible to use the second template 40 to draw the edges of the three dimensional shape prior to using the first template 30 to draw its contour. The first template 30 and the second template 40 may be hinged together along one edge to facilitate alignment. This may be accomplished with a strip of tape joining adjacent edges, or by using rings through the holes 31, 41 depicted in the drawings. It would also be possible to provide a uniformly spaced line of smaller holes to receive a spiral type binder.

The invention claimed is:

1. A template set for drawing a view of a three-dimensional shape, the view having solid lines representing the contour and visible edges of the shape, the template set comprising:

- a first template having at least one first aperture, each said at least one first aperture having a periphery circumscribing an area, the periphery representing the contour of a two-dimensional projection of a three-dimensional shape to be drawn, and
- a second template having at least one set of linear apertures falling with the area of a respective one of said at least one first aperture in the first template, each said set of linear apertures comprising at least one substantially continuous linear aperture corresponding to a visible edge of the three-dimensional shape to be drawn, whereby,
- a view of the tree-dimensional shape can be drawn by using said at least one first aperture in the first template to draw the contour of the two-dimensional projection of the three-dimensional shape, aligning the corresponding set of linear apertures of the second template within the contour, and using the at least one continuous linear aperture to draw at least one solid line representing at least one visible edge of the three-dimensional shape.

2. A template set as in claim 1 wherein at least one said set of linear apertures comprises two or more continuous linear apertures wbich intersect to define a visible corner of the three-dimensional shape.

3. A template set as in claim 1 wherein at least one linear aperture of said set of linear apertures in the second template further comprises at least one intermittent linear aperture corresponding to at least one hidden edge of the shape to be drawn, each said intermittent linear aperture comprising a series of linearly aligned, relatively short apertures separated by bridges in the second template, whereby, a view of a three-dimensional shape having dashed lines representing at least one bidden edge of the shape can be drawn by using said at least one intermittent linear aperture to draw at least one dashed line representing at least one hidden edge of the three-dimensional shape.

4. A template set as in claim 3 wherein said at least one said set of linear apertures in the second template comprises two or more intermittent linear apertures which intersect to define a hidden corner of the three-dimensional shape.

5. A template set as in claim 3 at least one of said continuous linear apertures pass through one of said bridges of said at least one intermittent linear aperture, said bridges providing support for areas of said second template circumscribed by said continuous linear apertures and said intermittent linear apertures.

6. A template set as in claim 1 wherein at least one said three-dimensional shape is a polygon, whereby said linear apertures are rectilinear.

7. A template set as in claim 1 wherein at least one said three-dimension shape is one of a cone and a cylinder, whereby at least some of said linear apertures are curved.

8. A template set as in claim 1 wherein at least one said set of linear apertures in said second template comprises additional linear apertures for drawing an alternative shape.

9. A template set as in claim 8 wherein said additional linear apertures represent a truncated form of a three-dimensional shape.

10. A template set as in claim 1 wherein said second template has a printed line circumscribing one of said at least one set of linear apertures, the printed line corresponding to the contour of the three-dimensional shape to be drawn with the set of linear apertures.

11. A template set as in claim 1 further comprising means for hinging said first template to said second template so that said at least one first aperture in said first template is aligned with said at least one set of linear apertures in said second template when said first and second templates are placed one on top of the other.

12. A template set as in claim 11 wherein said means for hinging said first template to said second template comprises a plurality of alignment holes in said first template and a plurality of alignment holes in said second template.

* * * * *